United States Patent
Saito et al.

(10) Patent No.: US 11,987,289 B2
(45) Date of Patent: May 21, 2024

(54) POWER UNIT SUSPENSION STRUCTURE

(71) Applicants: SUBARU CORPORATION, Tokyo (JP); TOYOTA JIDOSHA KABUSHIKI KAISHA, Aichi (JP); HINO MOTORS, LTD., Tokyo (JP); MAZDA MOTOR CORPORATION, Hiroshima (JP); ISUZU MOTORS LIMITED, Tokyo (JP); YAMAHA HATSUDOKI KABUSHIKI KAISHA, Shizuoka (JP)

(72) Inventors: Kan Saito, Osaka (JP); Toshiyuki Tsuchiya, Shizuoka (JP); Takashi Umezu, Tokyo (JP); Masao Tajima, Aichi (JP); Hiroyuki Shiraishi, Tokyo (JP); Toshimichi Nishikawa, Hiroshima (JP)

(73) Assignees: SUBARU CORPORATION, Tokyo (JP); TOYOTA JIDOSHA KABUSHIKI KAISHA, Aichi (JP); HINO MOTORS, LTD., Tokyo (JP); MAZDA MOTOR CORPORATION, Hiroshima (JP); ISUZU MOTORS LIMITED, Tokyo (JP); YAMAHA HATSUDOKI KABUSHIKI KAISHA, Shizuoka (JP)

( * ) Notice: Subject to any disclaimer, the term of this patent is extended or adjusted under 35 U.S.C. 154(b) by 232 days.

(21) Appl. No.: 17/608,993

(22) PCT Filed: Jan. 28, 2020

(86) PCT No.: PCT/JP2020/002993
§ 371 (c)(1),
(2) Date: Nov. 5, 2021

(87) PCT Pub. No.: WO2020/225947
PCT Pub. Date: Nov. 12, 2020

(65) Prior Publication Data
US 2022/0204084 A1 Jun. 30, 2022

(30) Foreign Application Priority Data
May 7, 2019 (JP) .................. 2019-087411

(51) Int. Cl.
*B60K 1/00* (2006.01)
*B62D 21/11* (2006.01)
*B60K 17/16* (2006.01)

(52) U.S. Cl.
CPC ............. *B62D 21/11* (2013.01); *B60K 1/00* (2013.01); *B60K 2001/001* (2013.01); *B60K 17/16* (2013.01)

(58) Field of Classification Search
CPC .......... B62D 21/11; B60K 1/00; B60K 17/16; B60K 2001/001
See application file for complete search history.

(56) References Cited

U.S. PATENT DOCUMENTS 9,718,356 B1 * 8/2017 Ikeda .................. B60K 17/16
2012/0153718 A1 6/2012 Rawlinson et al.
(Continued)

FOREIGN PATENT DOCUMENTS

CN 105073464 A 11/2015
JP 201296557 A 5/2012
(Continued)

OTHER PUBLICATIONS

Extended European Search Report in EP Application No. 20802115.4, dated Jan. 16, 2023, pp. 7.

*Primary Examiner* — Erez Gurari
(74) *Attorney, Agent, or Firm* — HAUPTMAN HAM, LLP

(57) ABSTRACT

A suspension structure for a power unit is configured to suspend a power unit including a motor, a transaxle, and a
(Continued)

power control unit. In the suspension structure for a power unit, the transaxle is arranged in a substantially center portion in a vehicle width direction, the motor is arranged at a position on an upper side with respect to the transaxle, and on one side in the vehicle width direction, and the power control unit is arranged at a position on the upper side with respect to the transaxle, and on an opposite side of the motor. In the suspension structure for a power unit, the motor and the power control unit are suspended on a principal axis of inertia substantially parallel with an axis in the vehicle width direction.

4 Claims, 3 Drawing Sheets

(56) References Cited

U.S. PATENT DOCUMENTS

| | | | | |
|---|---|---|---|---|
| 2017/0057349 | A1* | 3/2017 | Ogawa | F16H 57/037 |
| 2018/0119598 | A1* | 5/2018 | Mori | F01P 11/08 |
| 2018/0201125 | A1* | 7/2018 | Mori | B60L 3/0015 |
| 2018/0216713 | A1* | 8/2018 | LaForce | F16H 37/0813 |
| 2020/0156454 | A1* | 5/2020 | Yaguchi | B60K 6/405 |
| 2020/0238930 | A1* | 7/2020 | Yamanaka | B60R 16/0238 |
| 2020/0376946 | A1* | 12/2020 | Kuwahara | B62D 21/11 |
| 2022/0204084 | A1* | 6/2022 | Saito | B60K 1/00 |
| 2022/0216771 | A1* | 7/2022 | Kawashima | F16H 57/0441 |
| 2022/0325781 | A1* | 10/2022 | Sten | B60K 17/12 |
| 2022/0368203 | A1* | 11/2022 | Tanaka | H02K 1/2766 |
| 2023/0219409 | A1* | 7/2023 | Okuda | F16H 1/20 180/65.6 |
| 2023/0241955 | A1* | 8/2023 | Okuda | B60L 15/20 180/65.6 |

FOREIGN PATENT DOCUMENTS

| | | |
|---|---|---|
| JP | 2012171529 A | 9/2012 |
| JP | 5589772 B2 | 9/2014 |
| JP | 2015182749 A | 10/2015 |
| JP | 201622811 A | 2/2016 |
| JP | 2018154194 A | 10/2018 |

* cited by examiner

POWER UNIT SUSPENSION STRUCTURE

RELATED APPLICATIONS

The present application is a National Phase of International Application No. PCT/JP2020/002993 filed Jan. 28, 2020, which claims priority to Japanese Application No. 2019-087411, filed May 7, 2019.

TECHNICAL FIELD

The present invention relates to a suspension structure for a power unit of an electric vehicle, the power unit including a motor, a transaxle, and other unit-forming members.

BACKGROUND ART

Hitherto, there has been provided an electric vehicle including a suspension structure for a power unit like the one disclosed in Patent Literature 1. In the suspension structure for a power unit disclosed in Patent Literature 1, an axis common to a motor and a speed reducer is arranged in a vehicle width direction. Moreover, the suspension structure for a power unit disclosed in Patent Literature 1 has such a structure that both of a left side portion and a right side portion of the power unit are suspended from side frame portions of a sub-frame arranged around the power unit through intermediation of suspension brackets, mount rubbers, and motor-side mount brackets.

CITATION LIST

Patent Literature

[PTL 1] JP 2012-171529 A

SUMMARY OF INVENTION

Technical Problem

Many of related-art suspension structures for a power unit are intended for employing a vehicle body developed based on a vehicle equipped with an internal combustion engine as a vehicle body for an electric vehicle and suspending a power unit from the vehicle body. As a result, for example, when a differential gear is arranged at a position apart from a substantially center portion (centerline) in the vehicle width direction, in order to eliminate torque steer, another member such as an intermediate shaft may be required in some cases. Moreover, in the related-art suspension structure for a power unit, there may occur a problem of, for example, a restriction in an arrangement space in view of balance with side members. As a result, the related art has problems such as necessity of a large space in a vehicle front-rear direction for suspending the power unit.

Moreover, in the related-art suspension structure for a power unit, a principal axis of inertia of the unit is inclined with respect to an axis of the vehicle width direction or the like, and it is thus difficult to balance an axis of inertia in a unit roll direction, which is substantially parallel with the vehicle width direction. Consequently, when a drive reaction force is input, the power unit is not balanced, and there may occur such problems that the unbalance causes occurrence of large vibration and noise or is liable to reduce durability.

In view of the above-mentioned problems, the present invention has an object to provide a suspension structure for a power unit, which is capable of suspending the power unit in a well-balanced manner while saving a space required for suspending the power unit in a vehicle front-rear direction.

Solution to Problem

In order to solve the above-mentioned problems, according to the present invention, there is provided a suspension structure for a power unit of an electric vehicle, the power unit including a motor, a transaxle, and other unit-forming members, wherein the transaxle is arranged in a substantially center portion in a vehicle width direction, wherein the motor is arranged at a position on an upper side with respect to the transaxle, and on one side in the vehicle width direction, wherein some or all of the other unit-forming members are arranged at a position on the upper side with respect to the transaxle, and on an opposite side of the motor, and wherein the motor and the other unit-forming members are suspended on a principal axis of inertia substantially parallel with an axis in the vehicle width direction when the power unit is viewed from above.

The suspension structure for a power unit according to the present invention is configured such that the motor and the other unit-forming members are arranged on the upper side with respect to the transaxle. With this configuration, according to the suspension structure for a power unit of the present invention, it is possible to minimize the space in the vehicle front-rear direction required for suspending the power unit. Thus, according to the suspension structure for a power unit of the present invention, it is possible to expect various side effects achieved by the space saving in the vehicle front-rear direction. The side effects include, for example, an increase in a cabin of the electric vehicle and minimized portions (dead strokes upon a collision) remaining not crashed after impact of a collision is received.

Moreover, the suspension structure for a power unit of the present invention is configured such that the transaxle is arranged in the substantially center portion in the vehicle width direction, the motor is arranged on the one side with respect to the transaxle in the vehicle width direction, some or all of the other unit-forming members are arranged on the other side, and the motor and the other unit-forming members are suspended on the principal axis of inertia substantially parallel with the axis in the vehicle width direction. With this configuration, the axis of inertia in the unit roll direction, which is substantially parallel with the vehicle width direction, can be arranged substantially in parallel with the axis in the vehicle width direction, thereby being capable of suspending the power unit in a well-balanced manner. Thus, according to the suspension structure for a power unit of the present invention, there are expected such effects as, for example, suppression of vibration and noise and an increase in durability.

Moreover, as in the suspension structure for a power unit of the present invention, it is possible to reduce, upon collision, a liability of interference, for example, between the transaxle and a steering shaft, pedals, and the like by arranging the transaxle in the substantially center portion in the vehicle width direction. As a result, it is possible to suppress a liability of occurrence of dead strokes upon collision to the minimum in regions intended as crash strokes. Moreover, as a result of the minimization of the dead strokes, the present invention can also contribute to achievement of a short overhung of the electric vehicle and the space saving in the front-rear direction.

Moreover, it is preferred that, in the suspension structure for a power unit of the present invention, a differential gear provided for the transaxle be arranged on a center line passing through the substantially center portion in the vehicle width direction.

With this configuration, torsional rigidity acting on the left and right drive shafts, respectively, can be substantially uniform. As a result, occurrence of torque steer in the electric vehicle can be suppressed.

It is preferred that the suspension structure for a power unit of the present invention include a pair of side members arranged in such a manner as to extend in a front-rear direction on both sides of the electric vehicle in the vehicle width direction, the motor be suspended directly or indirectly from one of the pair of side members through intermediation of a first mount, some or all of the other unit-forming members be suspended directly or indirectly from another one of the pair of side members through intermediation of a second mount, and the suspension structure for a power unit further include a reaction force reception member configured to receive a toque reaction force which acts on the motor is provided.

With this configuration, the motor and the other unit-forming members can be brought into floating states. As a result, it is possible to reduce transmission of gear noise and vibration occurring to the other unit-forming members.

The motor and some or all of the other unit-forming members may be suspended directly from the side members through intermediation of the first mount and the second mount, respectively, as described above, but may be suspended from, for example, suspensions or a cross member, which is not mounted to the side members, through intermediation of the first mount and the second mount, thereby being indirectly suspended from the side members.

Moreover, the reaction force reception member configured to receive the torque reaction force acting on the motor may be formed of, for example, a mount similar to the first mount and the second mount, or may be formed of a so-called torque rod, a so-called torque stopper, or the like. Further, the reaction force reception member may be formed of a single mount or the like or a plurality of mounts or the like.

With the above-mentioned configuration, it is possible to match mount shafts each other between the left side and the right side of the vehicle. As a result, there are provided an effect of facilitating control of mount characteristics for the driving reaction force, an effect of facilitating matching between the pair of side members in yield strength and deformation amount upon a collision, and the like.

It is preferred that, in the suspension structure for a power unit of the present invention, each of one or both of the first mount and the second mount be arranged in a vicinity of a base end of a suspension tower provided for the electric vehicle, and be coupled to the suspension tower, or be integrated with the suspension tower.

With the above-mentioned configuration, it is possible to increase the body stiffness of the electric vehicle, and to suppress portions that are of the suspension towers, and remain not crashed to the minimum amounts even when the suspension towers receive impact of a collision.

It is preferred that, in the suspension structure for a power unit of the present invention, the other unit-forming members include a power control unit or another accessory.

Advantageous Effects of Invention

According to the present invention, the suspension structure for a power unit capable of suspending the power unit in a well-balanced manner while saving the space required for suspending the power unit in the vehicle front-rear direction can be provided.

DESCRIPTION OF EMBODIMENTS

Figure 1:
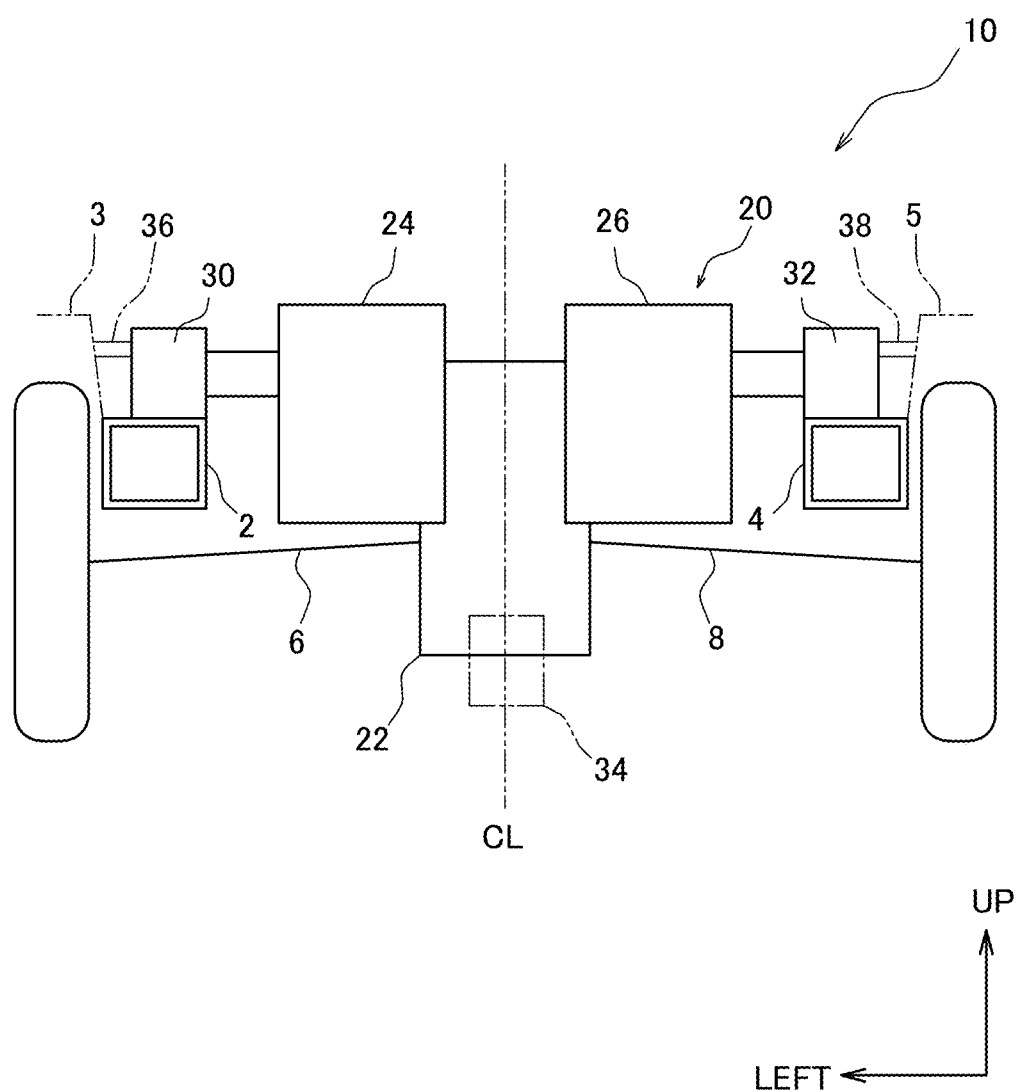
FIG. 1 is a schematic diagram for illustrating a suspension structure for a power unit according to an embodiment of the present invention.

Description is now given of a suspension structure 10 for a power unit (hereinafter referred to as "power unit suspension structure 10") according to an embodiment of the present invention with reference to drawings. As illustrated in FIG. 1, the power unit suspension structure 10 is configured to use a left side member 2 and a right side member 4 forming a body of an electric vehicle to suspend a power unit 20. The side members 2 and 4, respectively, are a pair of a left member and a right member arranged in such a manner as to extend in a vehicle front-rear direction on both sides (left and right) in a vehicle width direction of the electric vehicle.

As illustrated in FIG. 1, the power unit 20 includes a transaxle 22, a motor 24, and other unit-forming members. In the power unit suspension structure 10 according to this embodiment, as the other unit-forming members, a power control unit 26 is provided. The power unit 20 is installed in such a manner as to be suspended by the side members 2 and 4 through intermediation of a first mount 30 and a second mount 32, respectively, and so as to receive a torque reaction force acting on the motor 24 through intermediation of a reaction force reception member 34. It is possible to use, for example, a mount similar to the first mount 30 and the second mount 32, a so-called torque rod or a so-called torque stopper, or the like to form the reaction force reception member 34. The reaction force reception member 34 may be formed of a single mount or the like or a plurality of mounts or the like.

Specifically, the transaxle 22 is arranged in a substantially center portion in the vehicle width direction. The transaxle 22 is a device formed by integrating a transmission (not shown), a differential gear 22a, and the like with one another similarly to a transaxle that has hitherto been publicly known. The differential gear 22a is connected to drive shafts 6 and 8 provided in such a manner as to extend in both directions (a left direction and a right direction) in the vehicle width direction.

The motor 24 is arranged on an upper side with respect to the transaxle 22. Moreover, the motor 24 is arranged at a position adjacent to the transaxle 22 on one side (left side in the illustrated example) in the vehicle width direction. The transaxle 22 is suspended from the side member 2 on the left side through intermediation of the first mount 30. The first mount 30 is provided at a position of the side member 2 in a vicinity of a base of a suspension tower 3. An output shaft of the motor 24 is connected directly or indirectly to the differential gear 22a so as to be capable of transmitting power to the differential gear 22a.

The power control unit 26 is arranged on the upper side with respect to the transaxle 22. Moreover, the power control unit 26 is arranged at a position on an opposite side (right side in the illustrated example) of the motor 24. The power control unit 26 is suspended from the side member 4 on the right side through intermediation of the second mount 32. The second mount 32 is provided at a position of the side member 4 in a vicinity of a base of a suspension tower 5.

Figure 2:
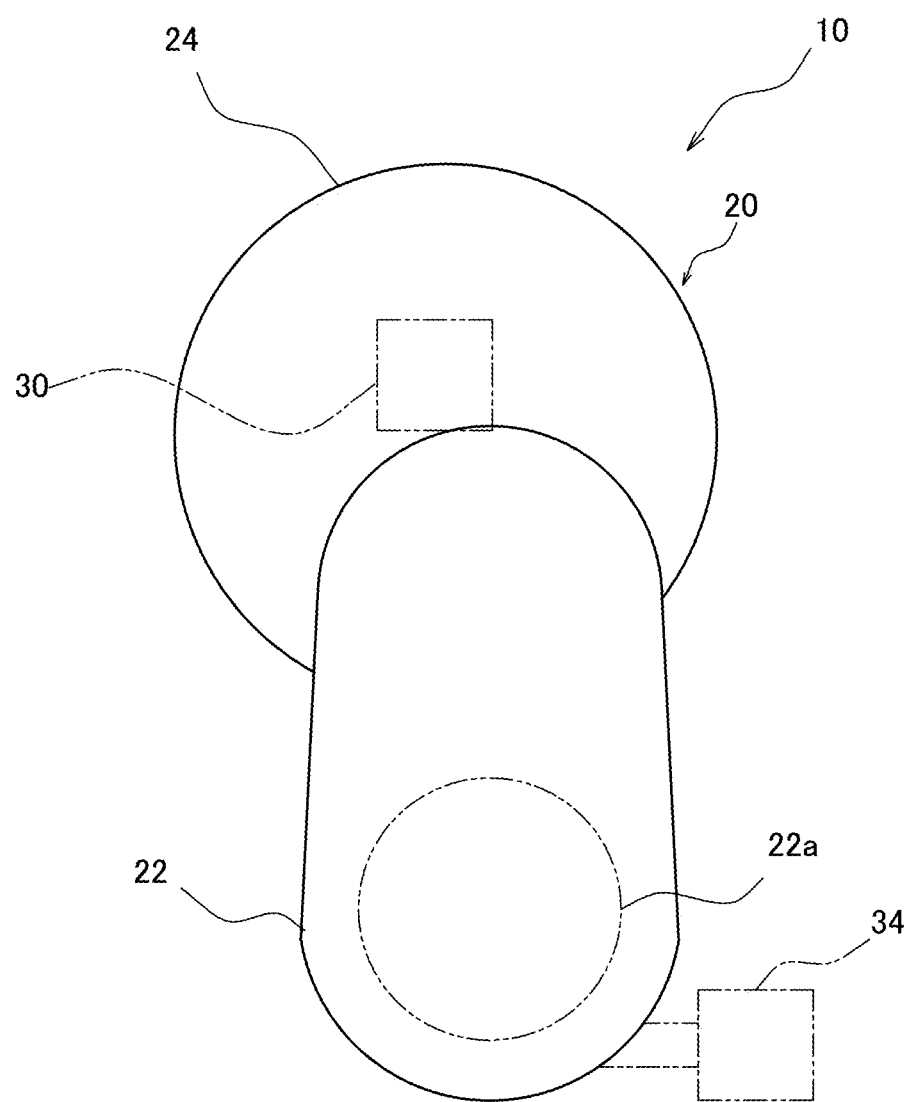
FIG. 2 is a side view of the suspension structure for a power unit of FIG. 1.
Figure 3A:
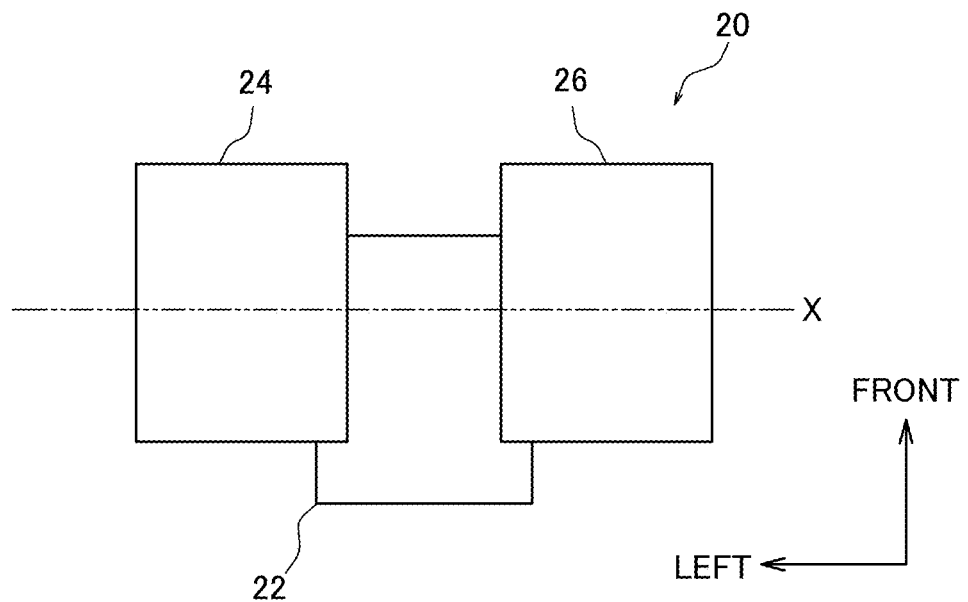
FIG. 3A and FIG. 3B are explanatory diagrams for illustrating a relationship between the suspension structure for a power unit and a principal axis of inertia.
Figure 3B:
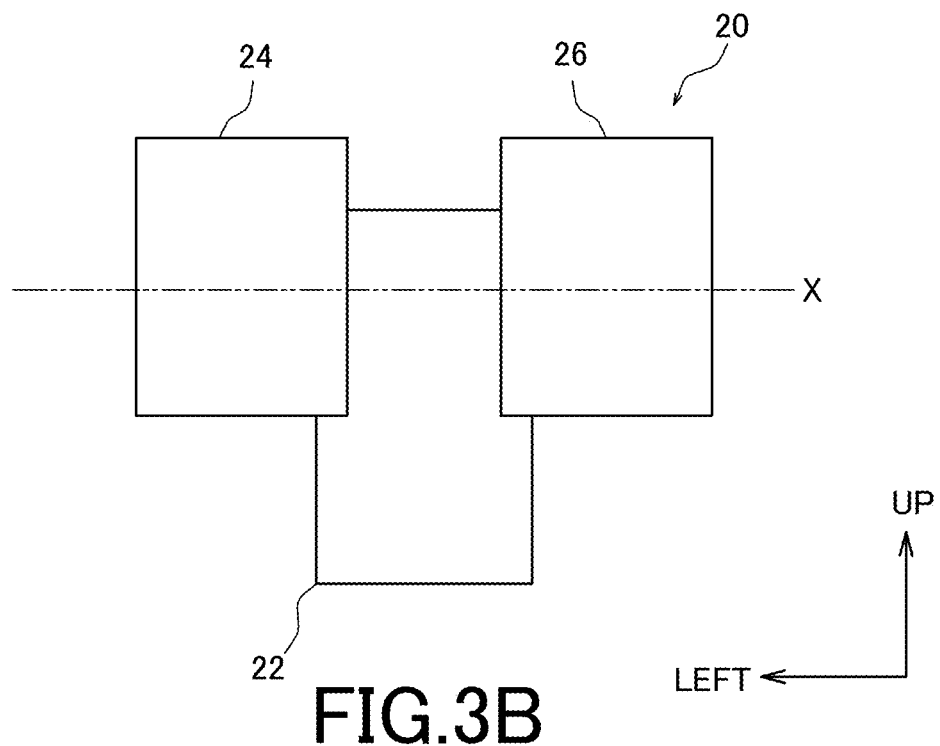

As illustrated in FIG. 1 and FIG. 2, the power unit suspension structure 10 is configured such that the motor 24 and the transaxle 22 (differential gear 22a) are arranged on the upper side and the lower side, respectively. Moreover, as illustrated in FIG. 3A and FIG. 3B, the power unit suspension structure 10 is configured such that the motor 24 and the power control unit 26 are suspended on a principal axis of inertia X substantially parallel with an axis in the vehicle width direction when the power unit 20 is viewed from an upper side of the vehicle (in a top view). Moreover, the power unit suspension structure 10 is configured such that the differential gear 22a comes to a center line CL passing through the substantially center portion in the vehicle width direction.

As described above, the power unit suspension structure 10 is configured such that the motor 24 and the power control unit 26 are arranged on the upper side with respect to the transaxle 22. Consequently, with the power unit suspension structure 10, it is possible to minimize the space in the vehicle front-rear direction required for suspending the power unit 20. As a result, it is possible to achieve, for example, space saving in the vehicle front-rear direction such as an increase in a cabin of the electric vehicle and minimized dead strokes upon a collision, and to achieve a short overhang.

Moreover, as described above, the power unit suspension structure 10 is configured such that the transaxle 22 is arranged in the substantially center portion in the vehicle width direction, the motor 24 is arranged on the one side with respect to the transaxle 22 in the vehicle width direction, and the power control unit 26 is arranged on the opposite side of the motor 24. Further, the motor 24 and the power control unit 26 are suspended directly above the principal axis of inertia X substantially parallel with the axis in the vehicle width direction. With this configuration, an axis of inertia in a unit roll direction, which is substantially parallel with the vehicle width direction, can be balanced, thereby being capable of suspending the power unit 20 in a well-balanced manner. Thus, with the power unit suspension structure 10, there are expected such effects as, for example, suppression of vibration and noise and an increase in durability.

Moreover, it is possible to reduce a liability of interference between the transaxle 22 and a steering shaft, pedals, and the like upon a collision by arranging the transaxle 22 in the substantially center portion in the vehicle width direction as in the power unit suspension structure 10 according to this embodiment. As a result, it is possible to suppress a liability of occurrence of portions (dead strokes) that remain not crashed when impact of a collision is received to the minimum degree in regions intended as crash strokes. Moreover, as a result of the minimization of the dead strokes, this embodiment can also contribute to achievement of the short overhang of the electric vehicle.

Moreover, as described above, the power unit suspension structure 10 is configured such that the differential gear 22a is arranged on the center line CL passing through the substantially center portion in the vehicle width direction. As a result, the lengths of the left drive shaft 6 and the right drive shaft 8 are substantially equal to each other, and torsional rigidity acting thereon, respectively, can be substantially uniform, thereby being capable of suppressing occurrence of torque steer.

As described above, in the power unit suspension structure 10 in this embodiment, the first mount 30 and the second mount 32 provided for the side members 2 and 4, respectively, and the reaction force reception member 34 can be used to bring the motor 24 and the power control unit 26 into a floating state. As a result, it is possible to reduce transmission of gear noise and vibration occurring to the power control unit 26. Moreover, with the above-mentioned configuration, it is possible to match mount shafts each other between the left side and the right side of the vehicle. As a result, the power unit suspension structure 10 facilitates control of a mount characteristic for the drive reaction force. Moreover, the power unit suspension structure 10 facilitates matching between the pair of the side members 2 and 4 in yield strength and deformation amount upon a collision.

Further, in the power unit suspension structure 10, the first mount 30 and the second mount 32 are arranged in the vicinities of the base ends of the suspension towers 3 and 5, respectively, provided for the electric vehicle. Still further, the first mount 30 and the second mount 32 are coupled to the suspension towers 3 and 5 through intermediation of coupling members 36 and 38 such as stays, respectively. With this configuration, it is possible to increase the body stiffness of the electric vehicle, and to suppress portions that are of the suspension towers, and remain not crashed to the minimum amounts even when the suspension towers receive the impact of a collision.

In the example of the power unit suspension structure 10 of FIG. 1, both of the first mount 30 and the second mount 32 are arranged in the vicinities of the base ends of the suspension towers 3 and 5, respectively, and are configured to be coupled to the suspension towers 3 and 5 through intermediations of the coupling members 36 and 38, respectively, but the present invention is not limited to this example. Specifically, the power unit suspension structure 10 may have such a configuration that the first mount 30 and the second mount 32 are integrated with the suspension towers 3 and 5 without intermediation of the coupling members 36 and 38, respectively. Moreover, in the power unit suspension structure 10, it is not always required to couple or integrate both of the first mount 30 and the second mount 32 to or with the suspension towers 3 and 5, respectively, and only any one of the first mount 30 and the second mount 32 may be coupled to or integrated with corresponding one of the suspension towers 3 and 5. Moreover, in a vehicle such as a vehicle of a rear drive type in which the coupling structure or the integration structure cannot be formed between the first mount 30 and the suspension tower 3 and between the second mount 32 and the suspension tower 5, it is not required to employ the above-mentioned coupling structure or the integration structure.

In this embodiment, there is described the example in which the power control unit 26 is provided as the other unit-forming member forming the power control unit 26 together with the motor 24 and the transaxle 22, and is provided at the position on the upper side with respect to the transaxle 22 and on the opposite side of the motor 24, but the present invention is not limited to this example. Specifically, as the other unit-forming member that is provided at the position on the upper side with respect to the transaxle 22 and on the opposite side of the motor 24, there may be provided, for example, an air conditioner compressor or the like as the another component in place of the power control unit 26 or in addition to the power control unit 26.

The present invention is not limited to the embodiments or modification examples described above, and it is easily understood for those skilled in the art that other embodiments may be provided from the teaching and spirit of the present invention without departing from the scope of claims.

INDUSTRIAL APPLICABILITY

The present invention may be suitably utilized in the electric vehicle equipped with the power unit including the motor, the transaxle, and the other unit-forming members.

The invention claimed is:

1. A suspension structure for a power unit of an electric vehicle, the power unit including a motor, a transaxle, and a power control unit,
   wherein the transaxle is arranged in a substantially center portion in a vehicle width direction,
   wherein the motor is arranged at a position on an upper side with respect to the transaxle, and on one side in the vehicle width direction,
   wherein the power control unit is arranged at a position on the upper side with respect to the transaxle, and on an opposite side of the motor, and
   wherein the motor and the power control unit is suspended on a principal axis of inertia, wherein the principal axis of inertia is substantially parallel with an axis in the vehicle width direction when the power unit is viewed from above.

2. The suspension structure for a power unit according to claim 1, wherein a differential gear provided for the transaxle is arranged on a center line passing through the substantially center portion in the vehicle width direction.

3. The suspension structure for a power unit according to claim 1, comprising a pair of side members arranged in such a manner as to extend in a front-rear direction on both sides of the electric vehicle in the vehicle width direction,
   wherein the motor is suspended directly or indirectly from one of the pair of side members through intermediation of a first mount, and
   wherein the power control unit is suspended directly or indirectly from another one of the pair of side members through intermediation of a second mount,
   the suspension structure further comprising a reaction force reception member configured to receive a toque reaction force which acts on the motor.

4. The suspension structure for a power unit according to claim 3, wherein each of one or both of the first mount and the second mount is arranged in a vicinity of a base end of a suspension tower provided for the electric vehicle, and is coupled to the suspension tower, or is integrated with the suspension tower.

* * * * *